A. T. WRIGHT.
Bee Hive.
No. 85,885.
Patented Jan. 12, 1869.
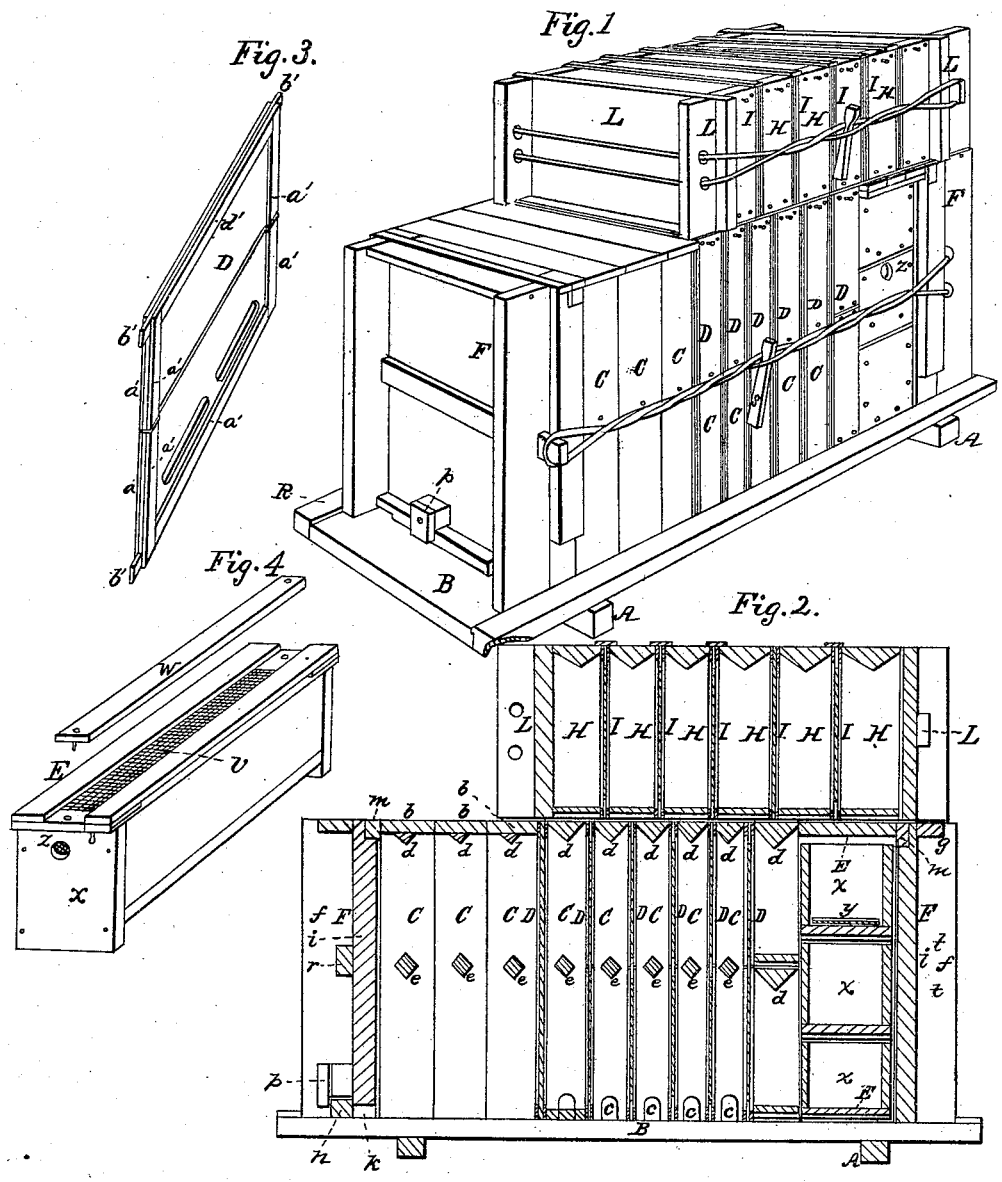

A. T. WRIGHT, OF NEW VIENNA, OHIO.

Letters Patent No. 85,885, dated January 12, 1869; antedated January 5, 1869.

---

IMPROVEMENT IN BEE-HIVES.

---

The Schedule referred to in these Letters Patent and making part of the same.

---

*To all whom it may concern:*

Be it known that I, A. T. WRIGHT, of New Vienna, in the county of Clinton, and in the State of Ohio, have invented certain new and useful Improvements in Bee-Hives; and do hereby declare that the following is a full, clear, and exact description thereof, reference being had to the accompanying drawings, and to the letters of reference marked thereon.

This bee-hive is an improvement upon my patent of June 4, 1867; and consists, first, in the arrangement of the feed-boxes $x\ x$ and their ventilating-top, E; second, in the arrangement of a series of frames, feed-boxes, comb-guides, &c., upon the floor B', and between the bars B B; and third, in the dividing-boards D being divided in their centres.

I do not claim connecting the comb-frames, feed-boxes, and dividing-boards by a twisting-pin and rope, nor the dividing-boards and comb-guides with strips around their edges, and a removable piece at the top, or any features herein shown that are found in my previous patent, or in my application for a patent on a bee-hive now pending.

In order to enable others skilled in the art to which my invention appertains, to make and use the same, I will now proceed to describe its construction and operation, referring to the annexed drawings, which form a part of this specification, and in which—

Figure 1 is a perspective of the hive;
Figure 2, a side elevation, in section, of the same;
Figure 3 is a perspective of the comb-guide; and
Figure 4, a perspective of feed-box with ventilator-top.

A A represent two cross-pieces, near the ends of which are laid the bars B B, and between them the floor B', forming a support for the bee-hive.

The floor B' and bars B B are so arranged that the edges of the latter extend above the surface of the floor, the better to hold the hive in proper position.

The hive proper consists of a series of frames C C, comb-guides D D, dividing-boards D' D', feed-boxes $x\ x$, with ventilating-top E, and end-pieces F F, all fastened together by cords, as will be hereinafter described.

The frames C C are formed of two vertical end-pieces, $a\ a$, one top bar, $b$, and a triangular bar, $d$, placed point downward on the under side of the top bar, and may have passages, $c\ c$, through which the bees enter into the hive. These frames may also have intermediate bars, $e\ e$, placed either horizontally or vertically, as the form and dimensions of the frames may require, and serve to support the combs and strengthen the frames.

The end-pieces are formed of the vertical side bars $f\ f$, top bar $g$, bottom bar $h$, and board $i$, leaving a passage, $k$, at the bottom for the bees to pass to and from the hive, and another passage at the top for the bees to pass from the hive to the honey-boxes, which are placed on top of the hive.

The passage mentioned at the top is closed by a removable bar, $m$, when so desired.

The removable and reversible bar, $n$, is designed to regulate the bee-passage $k$, by opening, or closing, or partially closing the same, as the ends of said bar are cut at different lengths, as shown in fig. 1.

This bar is held in position by a button, $p$.

One of the end-pieces, F, is provided with a bar, $r$, with projecting ends for attaching the cord to, that binds the hive together, said cord being tightened or loosened by twisting-pins $s\ s$.

The other end-piece, F, has holes, $t\ t$, through which the said cord is passed in connecting the hive and its several parts together.

The feed-boxes $x\ x$ are of the same length as the frames C C and end-pieces F F, and are placed above each other, their ends being so arranged as to project below their bottoms, leaving a passage along their sides for the bees.

On top of the upper feed-box is placed a ventilating-frame, E, which consists of two bars, $d'\ d'$, along the sides of the box, with a wire screen, $v$, between them, this wire screen being covered with a removable bar, $w$, as shown in fig. 4.

One of the feed-boxes, $x$, is provided with an aperture, $z$, covered on the inside with a screen to admit liquid feed into the box when so desired.

Between the frames C C are placed comb-guides D D, which guides are in two pieces, fitting on top of each other, as shown in fig. 3, leaving a passage between them through the centre. These comb-guides correspond in height and length with the frames C C, and may, in addition to the passage through their centre, have other slots or passages to allow the bees free passage from one frame to the other. They are also provided on both sides, along their edges, with strips, $a'\ a'$, and at their upper and lower edges with removable bars, $b'\ b'$, for the purpose of allowing free passage for the bees from the hive to the honey-boxes.

If desired to confine the bees to a certain part of the hive, then a dividing-board, D', made similar to the comb-guides, but in one piece, and without slots or passages, is placed at the desired point.

The dividing-boards have the strips $a'\ a'$ and removable bars $b'\ b'$, as well as the comb-guides, and the end-pieces F F are also provided on their inner side with the strips $a'\ a'$.

On top of the bee-hive so formed, I place the honey-boxes H H, which are separated by means of dividing-boards I I, said dividing-boards being slotted to admit the passage of the bees from one to the other, or not, as may be desired.

The honey-boxes H H and dividing-boards I I are held together by means of the end-pieces L L secured by cords and twisting-pins, each and every part being constructed in the same manner as the corresponding parts of the main hive, except that the honey-boxes, H H, have each a bar extending along from one end-piece to the other, forming the bottom of the same.

Having thus fully described my invention,

What I claim as new, and desire to secure by Letters Patent, is—

1. The arrangement of the feed-boxes $x\ x$ and ventilating-top E, when constructed and operating substantially as shown and described.

2. The arrangement of the bars B B, floor B', and a hive formed of a series of frames, feed-boxes, comb-guides, dividing-boards, and end-pieces, substantially as herein set forth.

3. The comb-guides D, made in two parts, and constructed and used substantially as herein set forth.

In testimony that I claim the foregoing, I have hereunto set my hand, this 28th day of October, 1868.

A. T. WRIGHT.

Witnesses:
C. C. BOWERS,
J. A. GRAVATT.